(12) United States Patent
Karmakar et al.

(10) Patent No.: US 9,164,169 B2
(45) Date of Patent: Oct. 20, 2015

(54) RADIO FREQUENCY TRANSPONDER SYSTEM

(75) Inventors: Nemai Chandra Karmakar, Clayton (AU); Isaac Balbin, Clayton (AU)

(73) Assignee: RFID Technologies Pty Ltd, Queenscliff (AU)

( * ) Notice: Subject to any disclaimer, the term of this patent is extended or adjusted under 35 U.S.C. 154(b) by 211 days.

(21) Appl. No.: 13/111,849

(22) Filed: May 19, 2011

(65) Prior Publication Data

US 2012/0161931 A1 Jun. 28, 2012

Related U.S. Application Data

(63) Continuation of application No. PCT/AU2009/001514, filed on Nov. 20, 2009.

(30) Foreign Application Priority Data

Nov. 20, 2008 (AU) ............................. 2008906011
Oct. 21, 2009 (AU) ............................. 2009905139

(51) Int. Cl.
| | |
|---|---|
| *H04Q 5/22* | (2006.01) |
| *G01S 13/82* | (2006.01) |
| *G01S 13/75* | (2006.01) |
| *G06K 19/077* | (2006.01) |
| *H01Q 1/22* | (2006.01) |
| *H01Q 9/04* | (2006.01) |
| *H01Q 21/24* | (2006.01) |

(52) U.S. Cl.
CPC ............. *G01S 13/825* (2013.01); *G01S 13/753* (2013.01); *G06K 19/07749* (2013.01); *H01Q 1/2225* (2013.01); *H01Q 9/0442* (2013.01); *H01Q 21/24* (2013.01)

(58) Field of Classification Search
CPC ....... H04W 12/08; G06K 7/008; H01Q 1/002
USPC ..................................... 340/10.1, 5.22, 12.51
See application file for complete search history.

(56) References Cited

U.S. PATENT DOCUMENTS 4,725,841 A * 2/1988 Nysen et al. .................... 342/44
5,045,862 A 9/1991 Alden et al.
(Continued)

FOREIGN PATENT DOCUMENTS

| EP | 1065623 A2 | 1/2001 |
|---|---|---|
| JP | 2007/053810 A | 3/2007 |

OTHER PUBLICATIONS

Karmakar, N. C., "Smart Antennas for Automatic Radio Frequency Identification Readers," Chapter 21, in Handbook on Advancements in Smart Antenna Technologies for Wireless Networks, Idea Group Inc., USA, pp. 449-473.

(Continued)

*Primary Examiner* — Vernal Brown
(74) *Attorney, Agent, or Firm* — Knobbe, Martens, Olson & Bear, LLP

(57) ABSTRACT

Various embodiments relate to a radio frequency transponder. In one embodiment, the transponder includes: a substrate and at least one planar antenna on the substrate, the antenna having a shape determining a corresponding resonant frequency of the antenna, wherein the antenna is configured to cause a phase difference between backscattered signals generated in response to excitation of the antenna by orthogonally polarized interrogation signals at the resonant frequency, and the phase difference represents a code of the antenna.

23 Claims, 23 Drawing Sheets

(56) References Cited

U.S. PATENT DOCUMENTS

| | | | |
|---|---|---|---|
| 5,995,046 A * | 11/1999 | Belcher et al. | 342/450 |
| 6,861,993 B2 | 3/2005 | Waldner | |
| 7,639,137 B2 * | 12/2009 | Mukherjee | 340/572.1 |
| 2005/0280539 A1 | 12/2005 | Pettus | |
| 2006/0220794 A1 | 10/2006 | Zhu | |
| 2011/0068181 A1 | 3/2011 | Simske et al. | |

OTHER PUBLICATIONS

D.M. Pozar, *Microwave Engineering*, Hoboken, NJ: John Wiley & Sons, 2005.

Sun, C. and Karmakar, N.C., "Direction of Arrival Estimation with a Novel Single-Port Smart Antenna," *EURASIP Journal on Applied Signal Processing*, 2004:9, pp. 1364-1375, 2004.

Zhang, Y.P., "Design and Experiment on Differentially-Driven Microstrip Antennas," *IEEE Trans. on AP*, vol. 55 No. 10, 2007, pp. 2701-2708.

Office Action dated May 16, 2014, received in Chinese Application No. 200980155302.3.

Extended European Search Report dated Feb. 11, 2014 in European Application No. 09827052.3 by European Patent Office.

International Search Report for Application No. PCT/AU2009/001514, Dated Jan. 28, 2010.

* cited by examiner

RADIO FREQUENCY TRANSPONDER SYSTEM

CROSS-REFERENCE TO RELATED APPLICATIONS

This application is a continuation application, and claims the benefit under 35 U.S.C. §§120 and 365 of PCT Application No. PCT/AU2009/001514, filed on Nov. 20, 2009, which is hereby incorporated by reference. PCT/AU2009/001514 also claimed priority from Australian Patent Applications Nos. 2008906011 filed on Nov. 20, 2008 and 2009905139 filed on Oct. 21, 2009, which are hereby incorporated by reference.

BACKGROUND

1. Field

The described technology generally relates to a radio frequency transponder, a radio frequency transponder system, and a process performed by the system. In one embodiment, the transponder is passive and the system may be used for identifying and tracking items where the transponders are in close proximity, such as when applied to books of libraries.

2. Description of the Related Technology

Radio frequency identification (RFID) systems are based around the use of an RFID tag which is a radio frequency transponder attached to an object and used to store a unique identification code for the object. The code is read from the tag by an RFID reader of the system. Most RFID systems employed in libraries use an RFID tag that includes an antenna and a microcontroller semiconductor chip that stores the unique identification code for the tag. In Australia, only about 6% of public libraries currently use RFID systems for identifying the items they hold. It is considered that one of the reasons for the relatively low adoption of RFID systems within libraries is the cost of the tags. The primary cost associated with tags including microcontrollers is the microcontroller itself.

SUMMARY

One inventive aspect is a radio frequency transponder, including: a substrate; and at least one planar antenna on the substrate, the antenna having a shape determining a corresponding resonant frequency of the antenna; wherein the antenna causes a phase difference between backscattered signals generated in response to excitation of the antenna by orthogonally polarized interrogation signals at the resonant frequency, and the phase difference represents a code of the antenna.

Another aspect is a radio frequency transponder system, including: the transponder; and a reader for generating the interrogation signals and reading the backscattered signals to extract the code.

Another aspect is a radio frequency reader for interrogating a radio frequency transponder, including: a frequency interface unit for transmitting polarized interrogation signals and receiving backscattered signals from the transponder in response; and a signal processing unit for determining a code of the transponder from phase difference of the backscattered signals.

Another aspect is a radio frequency process, including: transmitting polarized interrogation signals; receiving backscattered signals from a transponder in response; and determining a code of the transponder from phase difference of the backscattered signals.

DETAILED DESCRIPTION

A "chipless" RFID tag uses a transponder that is passive in that it does not include any active processing circuitry, such as a microcontroller. The absence of a microcontroller significantly reduces the cost. To compete with optical barcodes a chipless RFID system should have a reasonable read range (e.g. ≥30 cm) and use tags that are small in size, flexible and printable to reduce cost. Surface acoustic wave RFID tags have been adopted, but are rigid and bulky making them unsuitable for many applications, particularly in libraries where the items, or assets, with tags are stacked in arrangements where the tags are in close proximity.

A chipless RFID tag has been proposed which consists of a set of resonant dipoles and when interrogated is able to provide a signal that represents an RF barcode. The tag relies solely on a series of printed dipoles terminated in variable capacitors that create a series of resonant peaks that can be detected by a reader when interrogated. Another chipless tag that has been proposed includes a series of fractal structures where each is resonant at a different frequency and similarly can produce a backscattered signal when interrogated that represents a unique code. Detection, however, is based on backscattered amplitude which can be unreliable for many applications, particularly in libraries. Difficulties also arise in printing the proposed tags, such as when the tag includes structures gap-coupled to a microstrip line of the tag.

Other limitations associated with chipless printable RFID tags that have been proposed are their limited information carrying capacity (only 8 bits for time domain responses and 34 bits for frequency domain responses) and the efficiency and accuracy of the RFID readers used with the tags. The reader systems should be able to: (i) compensate for the limited capacity of information that can be extracted from a chipless RFID tag; (ii) read multiple chipless tags in close vicinity; and (iii) discriminate between the items the tags are applied to quickly and efficiently.

Accordingly, it is desired to address the above or at least provide a useful alternative.

Figure 1:
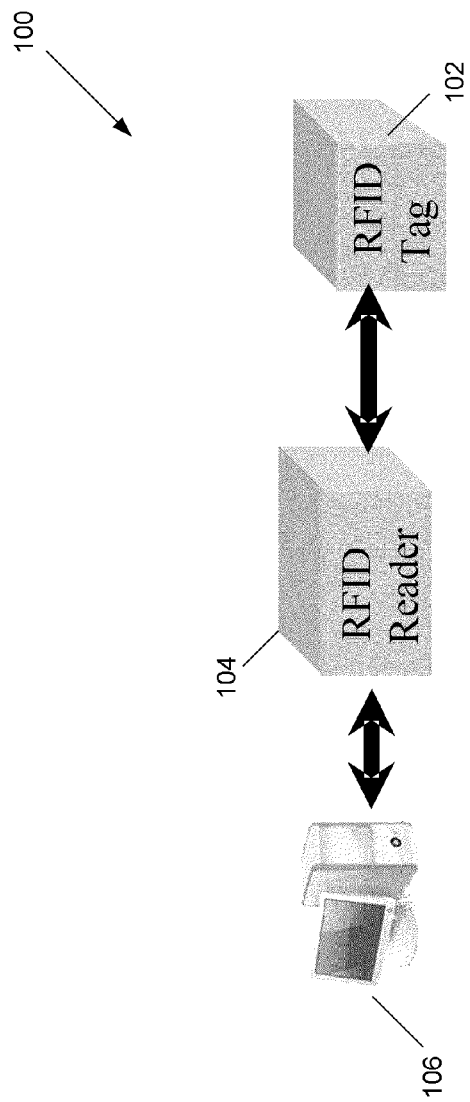
FIG. 1 is a block diagram of a radio frequency transponder system according to one embodiment.

A radio frequency transponder system 100, as shown in FIG. 1, is used for radio frequency identification (RFID) applications. The system 100 includes RFID tags 102, at least one RFID reader system 104 for interrogating or reading the tags using radio frequency interrogation or excitation signals, and an application system 106. The application system 106 is a computer system, such as produced by IBM Corporation or Apple Inc., having microprocessor circuitry, computer readable memory, and a data communications connection with the readers 104. The application system 106 stores and runs application and database software to process data provided by a reader 104 and record data associated with the items or assets on which the tags 102 are placed.

The RFID Tag

The tags 102 of the system 100 are each a passive and chipless (i.e. without a microcontroller or microprocessor) radio frequency transponder that stores a unique identification code for each tag 102. The code is obtained from the phase data of the back scattered signal from the transponder in two orthogonal polarization planes when the transponder is excited by radio frequency interrogation signals produced by the reader 104.

The tag 102 includes an array of stub loaded microstrip patch antennas printed on a dielectric substrate using electrically conductive ink. The stub loaded microstrip patch antenna (SLMPA) of the tag 102 is based on a microstrip patch antenna 202, shown in FIG. 2. The antenna 202 has a quadrilateral shape is printed on a substrate 204, has a length L, width W and a stub 206 which is used to load the antenna. The stub 206 is typically relatively thin with respect to the dimensions of the antenna. According to Y. P. Zhang, "Design and Experiment on Differentially-Driven Microstrip Antennas," *IEEE Trans. on AP*, vol. 55 no. 10, 2007, pp 2701-8 ("Zhang"), the antenna 202 is governed by the following equations for a substrate with thickness h, resonant free space wavelength $\lambda_o$ and relative permittivity $\in_r$, which enables the length and width to be selected based on a selected values of $\in_r$ (i.e. the choice of material), h and $\lambda_o$.

$$L = \frac{\lambda_o}{2\sqrt{\frac{\varepsilon_r + 1}{2}}} \quad (1)$$

$$W = \frac{\lambda_o}{2\sqrt{\varepsilon_{\mathit{eff}}}} - 2\Delta W \quad (2)$$

$$\Delta W = 0.412t \frac{(\varepsilon_{\mathit{eff}} + 0.3)\left(\frac{L}{h} + 0.264\right)}{(\varepsilon_{\mathit{eff}} - 0.258)\left(\frac{L}{h} 0.8\right)} \quad (3)$$

$$\varepsilon_{\mathit{eff}} = \frac{\varepsilon_r + 1}{2} + \frac{\varepsilon - 1}{2\sqrt{1 + \frac{12h}{L}}} \quad (4)$$

To obtain a maximum transfer of power from the antenna to the load, the characteristic impedance of the loading provided by the stub 206 needs to be matched to be the same as the real part of the input impedance of the antenna. This is desirable to maximize the effect that the load will have on the backscattered signal produced when the antenna 202 is excited by the interrogation signal. This allows a conjugate matching condition where the load $Z_L = Z_A^*$, where $Z_L$ is that antenna load impedance and $Z_A$ is the antenna input impedance. For simplicity, a 50 Ohm microstrip line is used for the stub 206 and according to Zhang its offset from the centre of the edge of the antenna 202 is given by:

$$\text{Offset} = \frac{W}{\pi}\cos^{-1}\frac{L\sqrt{5(\varepsilon_r - 1)}}{3\varepsilon_r + W} - \frac{L}{2} \quad (5)$$

For ease and cost of fabrication the antenna is loaded at its edge with a distributed load rather than a lumped load. The simplest sort of distributed load is an open circuit microstrip stub 206. The impedance of the open circuit microstrip stub 206 of length SL (Stub Length), with characteristic impedance $Z_o$, can be calculated using Richard's Transformation (as discussed in D. M. Pozar, *Microwave Engineering*, Hoboken, N.J.: John Wiley & Sons, 2005) and is given by:

$$Z_{IN} = -jZ_0\cot(\beta * SL) \quad (6)$$

$$\beta = \frac{2\pi}{\lambda_g} \quad (7)$$

where $\lambda_g$ is the guided transmission wavelength.

Figure 3:
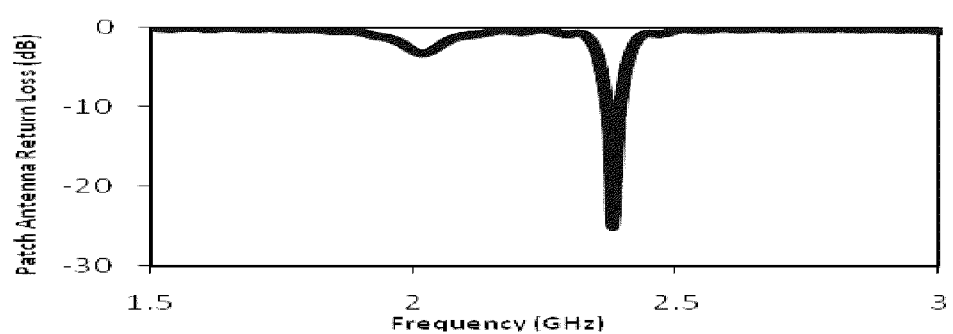
FIG. 3 is a graph of return signal loss against frequency for the antenna of FIG. 2.

A SLMPA 202 was designed and simulated using 3D electromagnetic simulation software that provides a full-wave method-of-moments solver. The parameters of the patch antenna 202 were L=39.2, W=47, Offset=7.4 and SL=0 (all in mm). The substrate used was Taconic TLX-0 ($\in_r$=2.45) with a thickness of 0.7874 mm and the conductor thickness was 17 um. The simulated return loss is shown in FIG. 3. The simulated results of FIG. 3 show a well matched antenna with a return loss peak of −24.9 dB at 2.4 GHz. The width of the patch 202 gives rise to multiple modes being excited and the fundamental mode for the orthogonal polarization is visible at 2 GHz.

Figure 4:
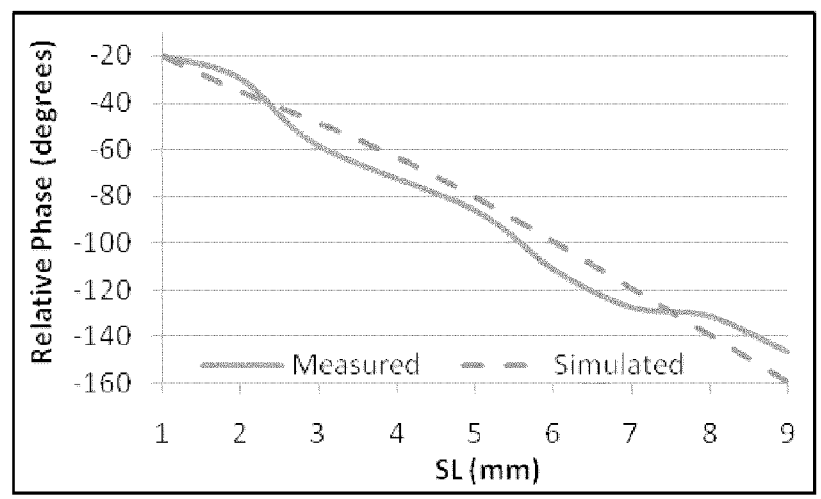
FIG. 4 is a graph of the relative phase of the backscattered signal against stub length of the antenna of FIG. 2.

The backscattering properties of the SMLPA 202 can be analysed using Radar Cross Section (RCS) analysis. The practical operating limits of using backscattered signals from an SLMPA can be analysed by examining the RCS characteristics of the antenna 202 when illuminated with a plane wave linearly polarized in the E-plane. The main phase characteristics of the backscattered signal include a phase shift that depends on the stub length as shown in FIG. 4. The phase shift data in FIG. 4 is shown relative to the backscattered phase of an SLMPA 202 with no stub loading. The relative phase or phase difference follows a generally linear pattern according to the electrical length of the loading stub. There is some discrepancy due to imperfections in the fabrication however they are not significant.

Figure 5:
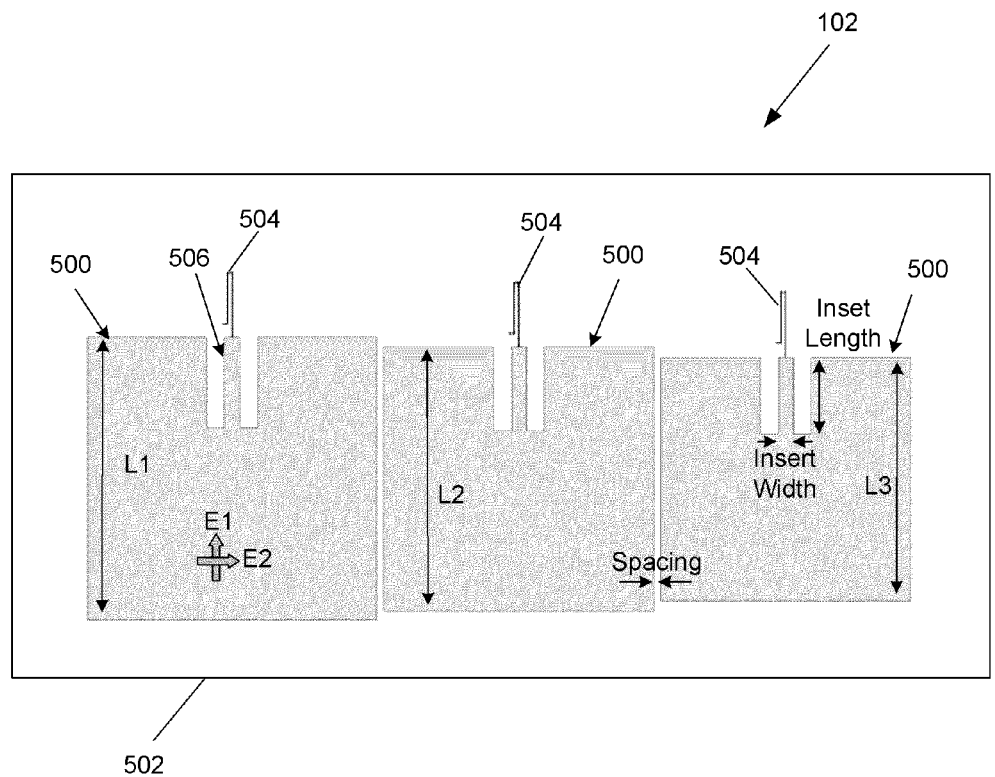
FIG. 5 is a diagram of a radio frequency transponder according to one embodiment.

The tag 102 of the transponder system 100 includes a number of SLMPAs 500, as shown in FIG. 5, which have different respective resonant frequencies to enable the backscattered signal from each antenna 500 of the tag to be isolated or separated from each other. The tag 102 is interrogated in two orthogonal planes using two excitation interrogation signals and the phase difference between the backscattered signal in the two planes is read and used to encode and determine the data of each antenna. Using a phase difference of two signals avoids fundamental issues associated with environmental conditions where the phase of the signal would change, and also avoids having to determine the spatial position of an antenna 500 or the tag 102.

Each SLMPA 500 is configured to resonate at the same frequency in both of the two orthogonal planes ($E_1$ and $E_2$) of the excitation signal. An SLMPA 500 can be encoded with a single bit of data by loading the antenna with no stub in one plane and a stub of length SL in the other plane. The unique bit of code associated with each antenna 500 can then be extracted by comparing the phase of the backscattered signal in the two polarization states, which is then digitised by the reader 104 to represent a 1 or 0.

Figure 2:
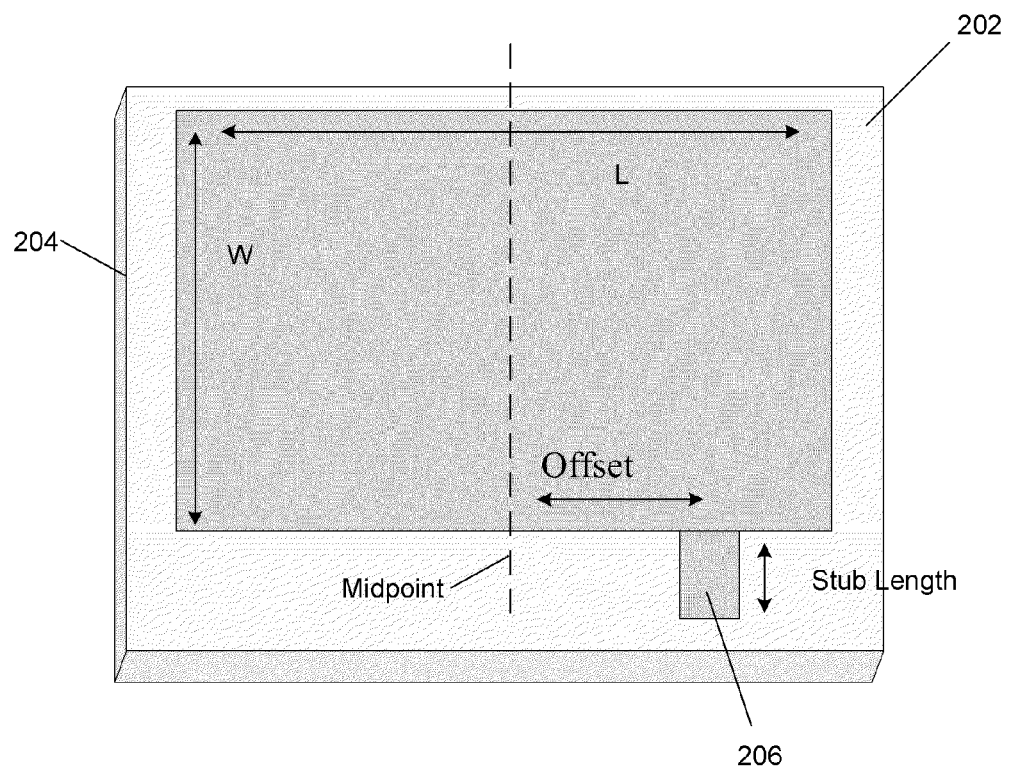
FIG. 2 is a diagram of a stub loaded microstrip patch antenna for a tag.

The tag 102 comprises of a plurality of SLMPAs 500, as shown in FIG. 5, printed using electrically conductive ink on a paper or plastic substrate 502. The antennas 500 are square so that the resonant frequency is the same for the orthogonally polarized excitation signals. Alternatively, the antennas 500 may be polygons of equal sides to exhibit this characteristic. The antennas 500 are of different lengths to correspond to respective different resonant frequencies. The antennas are each loaded by a respective meandering stub 504 having a stub length SL. The antennas 500 are printed adjacent each other with set spacing between them. Rather than simply loading the edge of each antenna with the stub, as shown in FIG. 2, an insert feed is used for each stub 504. The insert feed of each antenna 500 is characterised by two parallel rectangular recess sections in the antenna 500 to define an insert strip 506 having an insert length IL and an insert width IW. The insert 506 is edge loaded by the meandering stub 504. The stub 504 is a microstrip line that meanders away from and back towards the antenna 500 to improve spatial efficiency and to increase the stub's characteristic impedance, allowing larger impedances to be achieved with shorter overall stub lengths.

Figure 6:
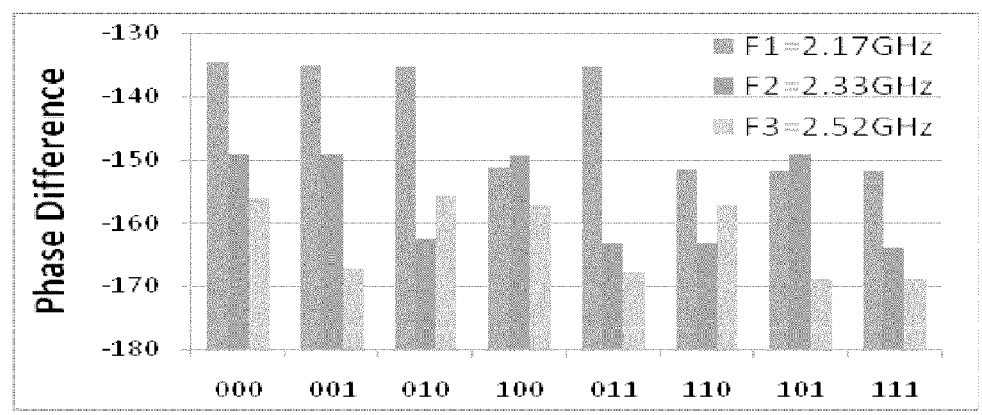
FIG. 6 is a graph of the phase difference between backscattered signals in two orthogonal polarizations against absence or presence of stubs on antennas of the transponder of FIG. 5, for different resonant frequencies.

To illustrate operation of the tag 102, a transponder with three square SLMPAs 500 with side lengths (and widths) 38 mm, 41 mm and 44 mm and a spacing of 1 mm was constructed so as to provide antennas with respective resonant frequencies of 2.52 GHz, 2.33 GHz and 2.17 GHz in both orthogonal planes. A meandering stub 504 of length 10.9 mm and width 0.2 mm was added to represent and encode a 1 bit, whereas the absence of any loading stub on the antenna 500 was used to represent a 0 bit. The transponder was interrogated with linearly polarized interrogation signals having E field vectors oriented in the directions E1 and E2, as shown in FIG. 5. The phase difference at boresight in the electric field was taken at 1 m, and the results obtained are shown in FIG. 6 when different combinations of absence and presence of the stub 504 were used. This shows that by merely processing the phase difference as the frequency is increased across the resonant frequencies, three unique binary bits can be extracted from a tag 102 using 3 square SLMPAs 500. The phase difference read by the reader 104, however, varies between 0 to 180°, and by using this entire phase difference a single antenna 500 of the tag 102 can be used to encode additional digital information. For example, a single antenna 500 can produce code comprising a hexadecimal digit if phase differences with a separation of 11.25° are detected. Encoding this phase difference with sufficient separation is achieved by changing the loading of the antenna by adjusting the length of the stub 504, for example by 1 to 2 mm for the example transponder. Therefore at each resonant frequency a hexadecimal digit can be obtained from the tag 102.

An RFID tag 102 with n antennas 500 resonant at different frequencies $f_1, f_2 \ldots f_{n-1}, f_n$ in an array configuration, as shown in FIG. 5 allows n hexadecimal digits to be obtained by the reader 104 when the tag 102 is interrogated by the orthogonally polarized excitation signals $E_1$ and $E_2$. The reader 104 scans across the frequencies $f_1$ to $f_n$ to extract a codeword (or barcode) comprising the codes of each antenna 500. The codeword represents the unique identification data (or ID) of the tag 102. The reader 104 converts the magnitude of the phase difference of the backscattered signals at each resonant frequency $f_1$ to $f_n$ into a digital hexadecimal integer comprising a code and repeats the process at the next resonant frequency, until the stop bit of the codeword is found.

Figure 7:
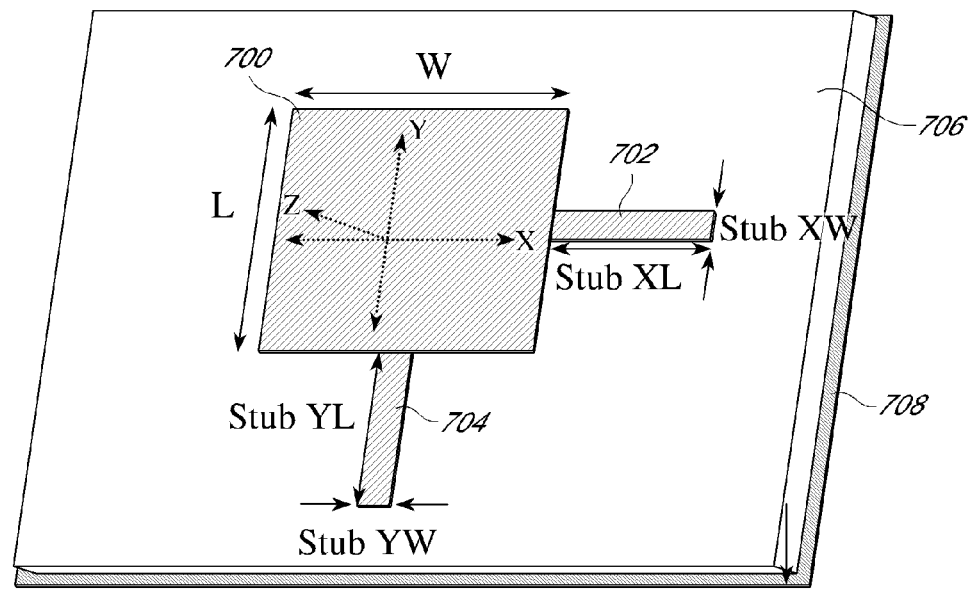
FIG. 7 is a diagram of a dual polarized stub loaded microstrip patch antenna for a tag.
Figure 8:
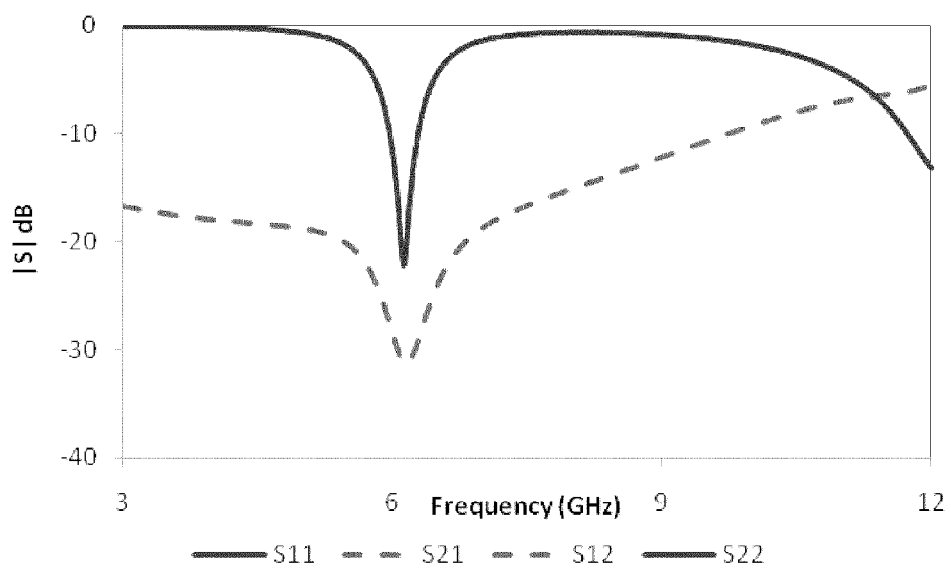
FIG. 8 is a graph of return and insertion losses against frequency for the antenna of FIG. 7.
Figure 9:
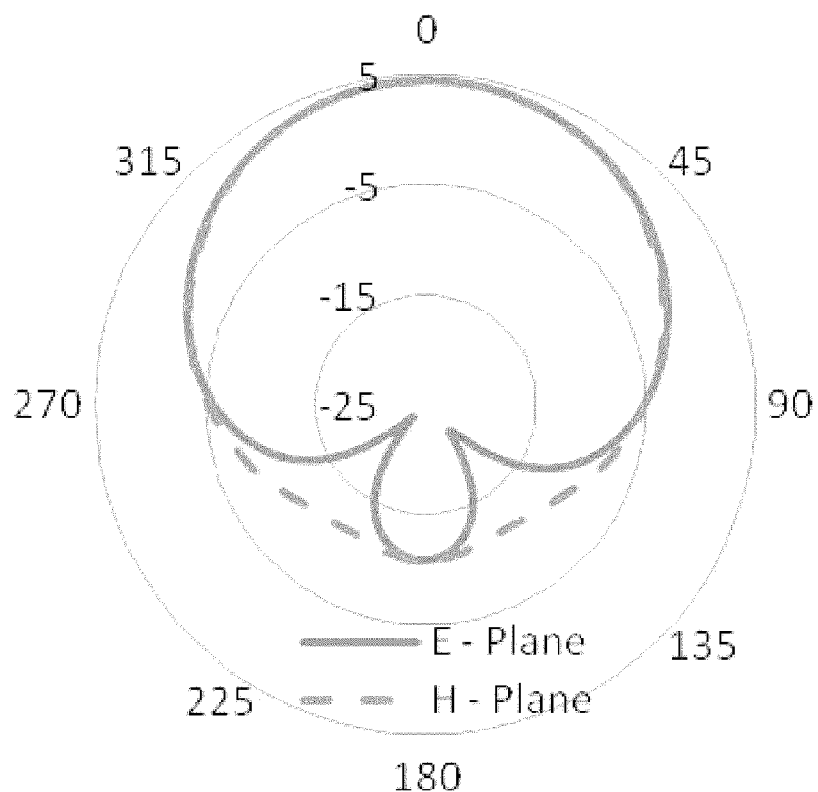
FIG. 9 is a radiation pattern for the antenna of FIG. 7.

An alternative SLMPA 700 for use in the tag 102 is shown in FIG. 7. This SLMPA 700 is square and is loaded with two open circuit stubs 702 and 704 whose lengths are orthogonal to one another and extend from respective and adjacent sides of the patch antenna 700. This antenna 700 is dual-resonant and will exhibit a maximum antenna mode RCS at the desired resonant frequency by selecting the lengths and the characteristic impedance of the stubs, as discussed below. The antenna 700 has the advantage that it allows the signals in the H plane to also be utilised as a reference and provide greater discrimination. The SLMPA 700 is again fabricated of conductive material and placed on a dielectric substrate 706 which is placed on a conductive ground plane 708. An SLMPA 700 was designed to resonate at 6.12 GHz on a 1.5 mm thick FR4 ($\varepsilon_r=4.9$) substrate, with L=W=10 mm, StubXL=StubYL=1.5 mm and StubXW=StubYW=0.2 mm. Operation of the circuit was simulated using the full-wave method-of-moments solver and the simulation ports were placed with an input impedance equal to that of free space at the end of the loading stubs, Port 1 at the end of StubY and Port 2 at the end of StubX. The return loss obtained for the SLMPA 700 is shown in FIG. 8, where the $S_{11}$ and $S_{22}$ plots are the same and the $S_{21}$ and $S_{12}$ plots are the same and the subscripts represent the input and output ports examined. The two-dimensional radiation patterns for the backscattered signals in both the E and H planes are shown in FIG. 9. This shows a good return loss of −22.2 dB at 6.12 GHz for both ports, and transmission leakage of power from one port to the other of −31.3 dB. The antenna has a gain of 4.4 dBi, and the radiation pattern shows a main lobe radiating in the outward normal direction of the patch (boresight).

If a single antenna is used to send and receive signals in each polarization state, the radar range equation is given by $$\frac{P_R}{P_T} = \frac{G^2 \lambda^2 \sigma}{(4\pi)^3 r^4} \qquad (8)$$

where,
$P_R$=The received power (W)
$P_T$=The transmitter power (W)
G=The reader antenna gain r=The distance between the tag and the reader (m)=
σ=The Radar Cross Section (RCS) of the transponder (m²)

Accordingly, the RCS can be varied with respect to frequency and create a frequency spectrum where distinct changes in the phase and amplitude are observable. The RCS consists of two components referred to as the antenna mode scattering and the structural mode scattering. The structural mode scattering is an unavoidable portion of the RCS that occurs due to the structure of the SLMPA itself, and exists for all possible radar targets. In general this scattering component does not exhibit a phase difference between its orthogonally polarized components. The antenna mode is a function of the radiation characteristics of the antenna itself and is designed using standard antenna theory, as described above.

The two scattering component parameters are defined with respect to the total electric field scattered from an antenna given by the following, as discussed in C. A. Balanis, *Antenna Theory: Analysis and Design*, 2$^{nd}$ edition, Hoboken, N.J.: John Wiley & Sons, 2005 ("Balanis").

$$E^s(Z_L) = E^s(Z_A^*) - \frac{I_m^*}{I_t} \Gamma^* E^t \qquad (9)$$

where, $E^s(Z_L)$=The electric field scattered by the antenna when it is loaded with an impedance of $Z_L$
$E^S(Z_A^*)$=The electric field scattered by the antenna when it is conjugate matched
$Z_A^*$=The conjugate antenna input impedance
$I_m^*$=The current induced when the antenna is in transmitting mode with a conjugate match
$I_t$=The current induced when the antenna is in transmitting mode
$\Gamma^*$=The conjugate matched reflection co-efficient
$E^t$=The time-varying electric field The first term $E^S(Z_A^*)$ in equation (9) represents the antenna mode scattering and the second term $$\frac{I_m^*}{I_t} \Gamma^* E^t$$

the structural mode scattering. Accordingly, changing the loading impedance of the antenna changes the antenna mode scattering component of the RCS, as discussed above for the SLMPAs 200 and 700.

Figure 10:
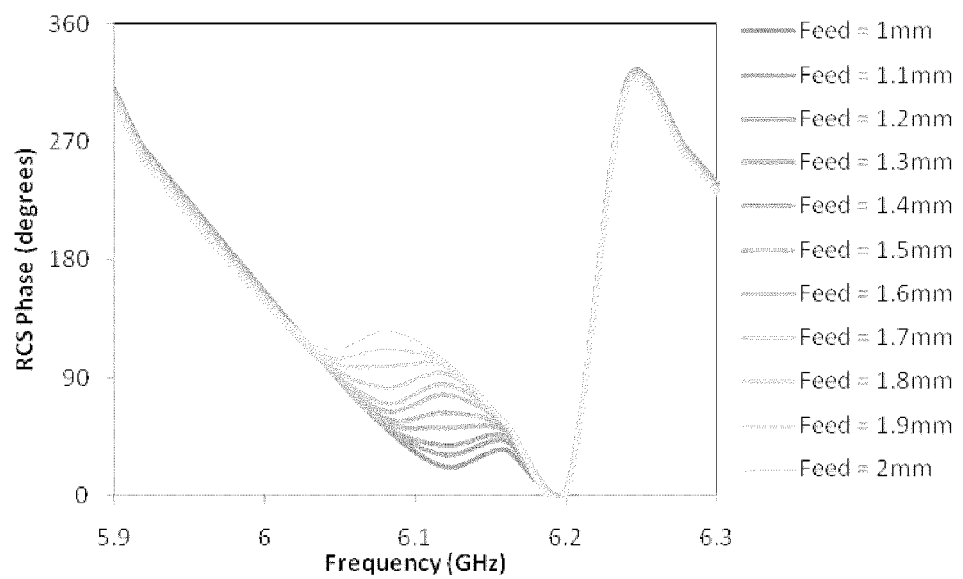
FIG. 10 is a graph of the phase of the backscattered signal against frequency and for different stub lengths for the antenna of FIG. 7.

With regard to the structural mode for the SLMPA 700, this can be determined by providing the antenna 700 with different loading stub lengths. In simulating the RCS of the antenna 700, the structural mode was found to be almost constant across the frequency band except for a clear resonant dip at 6.12 GHz. Outside of the resonant band the scattering consists of only the structural mode component, while in the band it is a combination of both the antenna and structural mode components. The resonance appears as a null in the RCS indicating destructive interference between the two scattering components. The phase response showed a smooth pattern except in the resonant band where a steady increase in the phase is observed as the loading stub is extended. When the length of the loading stub is varied from 1 to 2 mm while keeping all other parameters constant there is a clearly observable 82 degree phase shift at 6.12 GHz in the backscattered signal that only occurs within the SLMPA's resonant bandwidth, as shown in FIG. 10. The resonant peak changes by 80 MHz for a 1 mm change in the loading stub length however this is not significant since the bandwidth of the resonance is 200 MHz and the selected design frequency of 6.12 GHz remains in the operating band at all times. An RCS E-field cross-polar plot showed that the axial ratio is never poorer than 15 dB, which ensures the interrogation signal in one polarization does not substantially influence the backscattered signal in the orthogonal polarization. For multiple SLMPAs 700 to generate multiple frequency signatures without substantial frequency overlap and thus maximize the amount of data that is stored on the tag 102, it is desirable that the phase shift in the non-resonant portions of the spectrum be substantially 0, as shown in FIG. 10.

Figure 11:
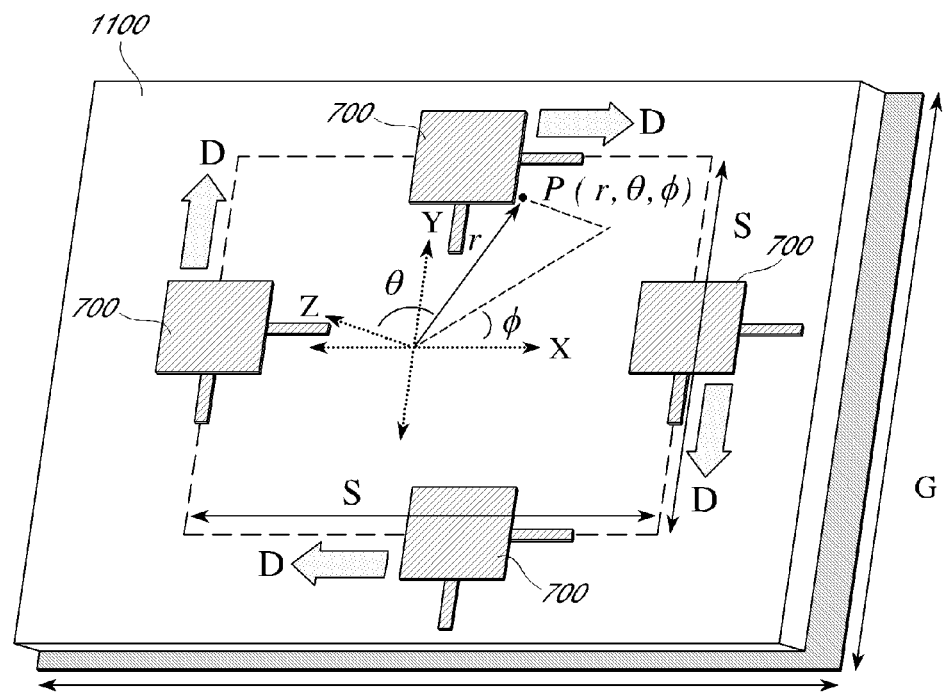
FIG. 11 is a diagram of a two-by-two array of patch antennas of FIG. 7.

To increase the gain and introduce an element of symmetry in both the design of the tag 102 and the backscattered signals produced, an array of SLMPAs is used. For a two-by-two array 1100, as shown in FIG. 11, there are a number of factors that affect the overall radiation characteristics of the structure. These include the layout of the array (linear, planar etc.), the distance between the elements and the excitation amplitude and phase of each element. The transponder 102 is illuminated with a plane wave with uniform magnitude and phase and so the excitation amplitude and phase are equal.

The array 1100 consists of four identical SLMPAs 700 in a North, South, East, West (NSEW) layout as shown in FIG. 11. The elements 700 are arranged symmetrically along a square of side length S. The inter-element spacing is described by the parameter S and the element orientation is described by the translation parameter D, which has values from −0.5*S to 0.5*S. The translation described by the parameter D for each element is in the clockwise direction indicated in FIG. 11. The transponder ground plane is square shaped so that the structural mode scattering in each orthogonal polarization is equal, and its edge length is G.

For an array of identical radiating elements 700, the total radiated field as a product of the single element radiation pattern and the Array Factor (AF) is:

$$E_{Total} = E_{Single\ element} * AF \qquad (10)$$

For an N×M element planar array where the x separation is denoted by $d_x$, the y separation is denoted by $d_y$ and each element is excited by amplitude $I_{mn}$ and phase β, the array factor is given by the following, as discussed in Balanis.

$$AF = \sum_{n=1}^{N} I_{1n} \left[ \sum_{m=1}^{M} I_{m1} e^{j(m-1)(kd_x sin\theta cos\phi + \beta_x)} \right] e^{j(n-1)(kd_y sin\theta sin\phi + \beta_y)} \qquad (11)$$

For the 2×2 array layout of FIG. 11 the array factor expands to $$AF = e^{jk\frac{S}{2}sin\theta sin\phi} e^{jkD sin\theta cos\phi} + e^{-jk\frac{S}{2}sin\theta sin\phi} e^{-jkD sin\theta cos\phi} + \qquad (12)$$
$$e^{jk\frac{S}{2}sin\theta cos\phi} e^{-jkD sin\theta sin\phi} + e^{-jk\frac{S}{2}sin\theta cos\phi} e^{jkD sin\theta sin\phi}$$

There are two layouts or cases that exist which are referred to herein as the NSEW case (as shown in FIG. 11) and the Corners case. The NSEW case exists when D=0, and the Corners case exists when D=±0.5*S. In the Corners case Equation (12) becomes $$AF = e^{jk\frac{S}{2}sin\theta sin\phi} e^{jk\frac{S}{2}sin\theta cos\phi} + e^{-jk\frac{S}{2}sin\theta sin\phi} e^{-jk\frac{S}{2}sin\theta cos\phi} + \qquad (13)$$
$$e^{jk\frac{S}{2}sin\theta cos\phi} e^{-jk\frac{S}{2}sin\theta sin\phi} + e^{-jk\frac{S}{2}sin\theta cos\phi} e^{jk\frac{S}{2}sin\theta sin\phi}$$

Equation (13) is the same array factor as for a standard 2×2 planar array with an inter-element separation of S. The normalized form can be expressed as $$AF_n = \frac{1}{4} \frac{\sin(kS\sin\theta\sin\phi)}{\sin\left(k\frac{S}{2}\sin\theta\sin\phi\right)} \frac{\sin(kS\sin\theta\cos\phi)}{\sin\left(k\frac{S}{2}\sin\theta\cos\phi\right)} \quad (14)$$

According to Balanis the angle, θ, where the main and grating lobes of the array factor will exist is given by $$\theta = \sin^{-1}\left(\frac{\pm m\lambda}{S\cos\phi}\right) = \sin^{-1}\left(\frac{\pm n\lambda}{S\sin\phi}\right), m, n = 0, 1, 2 \ldots \quad (15)$$

For the NSEW case equation (12) reduces to $$AF = e^{jk\frac{S}{2}\sin\theta\sin\phi} + e^{-jk\frac{S}{2}\sin\theta\sin\phi} + e^{jk\frac{S}{2}\sin\theta\cos\phi} + e^{-jk\frac{S}{2}\sin\theta\cos\phi} \quad (16)$$

This can then be normalized to $$AF_n = \cos\left(k\frac{S}{4}\sin\theta(\sin\phi + \cos\phi)\right) * \cos\left(k\frac{S}{4}\sin\theta(\sin\phi - \cos\phi)\right) \quad (17)$$

Using the same procedure the maximum of the array factor will occur when $$k\frac{S}{4}\sin\theta(\sin\phi + \cos\phi) = m\pi, m = 0, \pm 1, \pm 2, \ldots \text{ and} \quad (18)$$

$$k\frac{S}{4}\sin\theta(\sin\phi - \cos\phi) = n\pi, n = 0, \pm 1, \pm 2, \ldots$$

which means that the main and grating lobes of the array will occur at $$\theta = \sin^{-1}\left(\frac{\pm 2m\lambda}{S(\sin\phi + \cos\phi)}\right) = \sin^{-1}\left(\frac{\pm 2n\lambda}{S(\sin\phi - \cos\phi)}\right), \quad (19)$$
$$m, n = 0, 1, 2 \ldots$$

Equations (15) and (19) show that the larger the separation between the elements defined by the parameter S, the smaller the angle θ where the 1$^{st}$ grating lobe will occur. In other words the closer the elements are to each other than the better the sidelobe performance will be. Also, the NSEW layout should have its optimum size with larger values of S since there is a factor of 2 in equation (19) that does not exist in equation (15).

The performance of the 2×2 SLMPA array 1100 was simulated using the full-wave method-of-moments solver, and the radiation characteristics of the structure relate directly to the antenna mode scattering component. The array 1100 was illuminated by a uniform plane wave, and so the excitation for each port was uniform with no phase offset, and to make the result comparable with that for a single SLMPA 700 only 25% of the power used previously was delivered to the whole array 1100.

Figure 12:
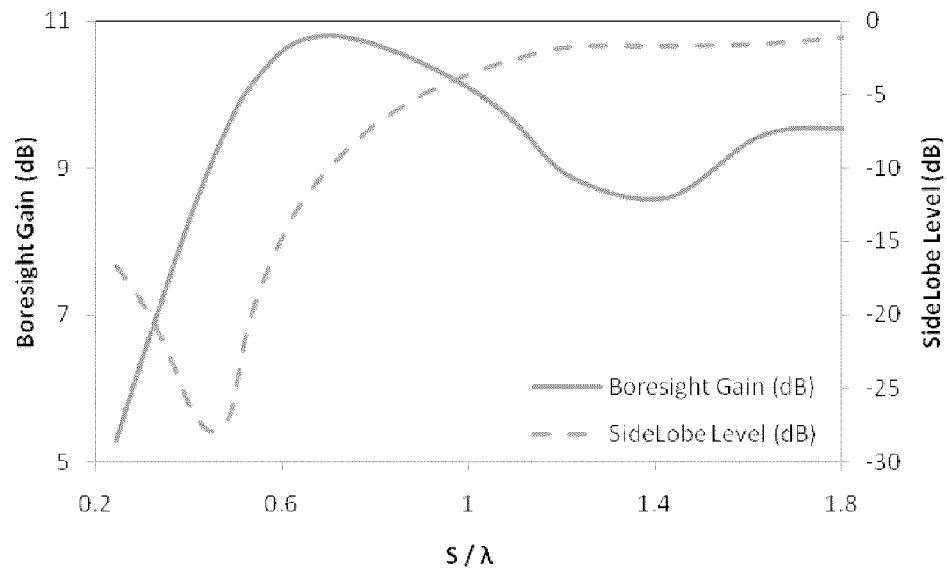
FIG. 12 is a graph of radiation characteristics (boresight gain and side lobes) against element separation for the array of FIG. 11 in a Corners layout.
Figure 13:
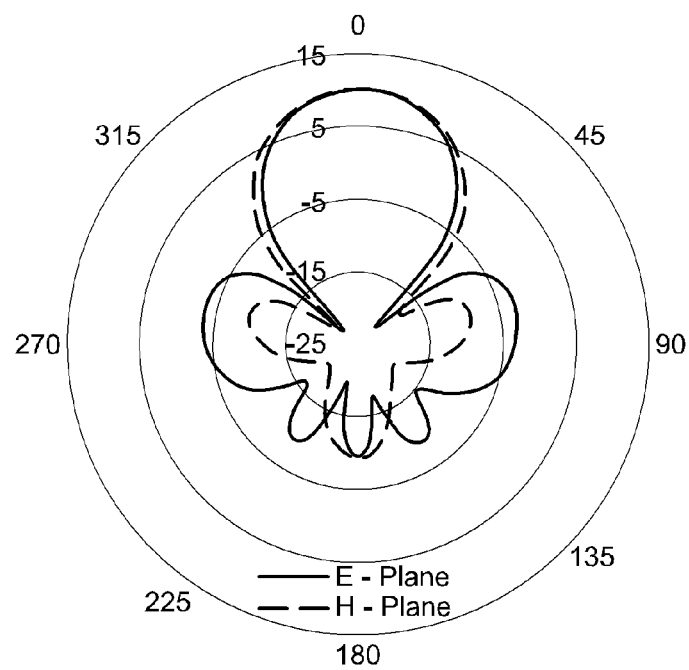
FIG. 13 is a radiation pattern for the array of FIG. 11.

The radiation patterns obtained are shown in FIGS. 12 and 13 for the Corners case layout with S=0.61λ (30 mm). The antenna array showed an improved maximum gain of 10.2 dBi with a side lobe of −13.9 dB, as shown in FIG. 12. The side lobe level becomes larger as the element separation moves beyond half of the free space wavelength, and then multiple side lobes begin to appear. The antenna main beam gain is over 10 dBi when 0.5*λ<S<λ, as shown in FIG. 12, while the side lobe level remains below −3 dB.

Figure 14:
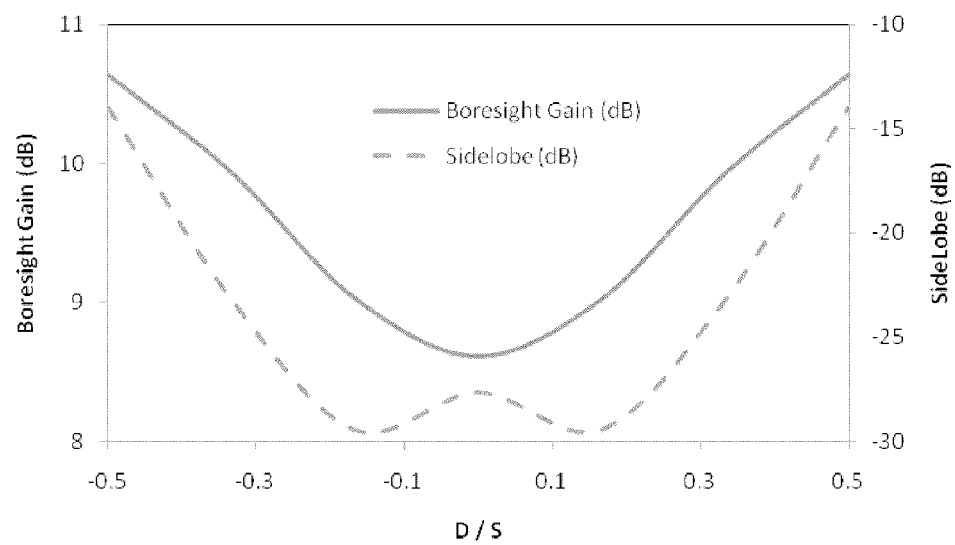
FIG. 14 is a graph of radiation characteristics (boresight gain and side lobes) against element translation distance for positions of antennas in the array.
Figure 15:
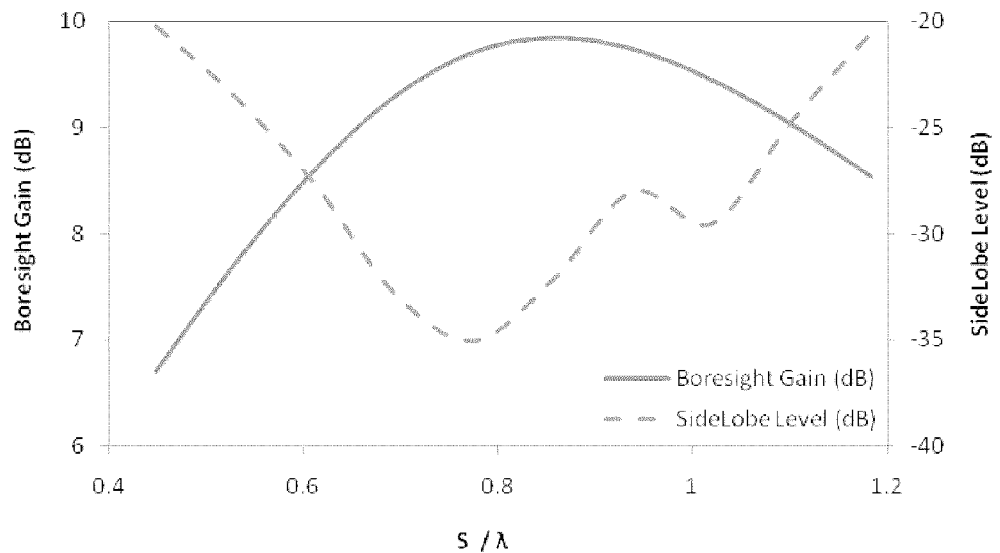
FIG. 15 is a graph of radiation characteristics (boresight gain and side lobes) against element separation for the array of FIG. 11 in a NSEW layout.

To allow more flexibility in placement of the array elements the translation, −0.5*S<D<0.5*S, was examined. As D increases in magnitude the array factor tends towards the form for the Corners case until the upper limit is reached. As D decreases in magnitude the array factor tends towards the NSEW case. Assuming that there is a uniform change in the radiation pattern for both, when D is varied the change in the boresight gain and side lobe level is as shown in FIG. 14. Both curves are symmetrical around the point where D=0 as expected from equation (12) and this is where the minimum gain level is observed. The NSEW case exists when D=0, and when S is varied to create the second design curve for placement shown in FIG. 15, in this position it is better to have the elements 700 farther away than for the Corners case and the side lobe magnitude is smaller.

The above applies to the antenna mode scattering component, however the structural mode scattering is dependent on the overall size of the structure including the substrate and the ground plane. If the structure of the tag 102 is too large then the antenna mode scattering component will be too small compared with the structural mode scattering component and no longer observable. As the edge length G is increased the structural mode scattering increases significantly and the resonance is increasingly difficult to observe. Also, when the ground plane size is too small the radiation of the elements is disturbed at the edges. To determine the optimal size of the ground plane, the ratio of the total RCS and the structural mode component of the RCS at resonance for the array 1100 with SLMPAs of L=10 mm was examined using RCS analysis, and the ratio was found to be largest when G is 64 mm since this is the smallest size where the radiation of the antenna elements is undisturbed.

Figure 16:
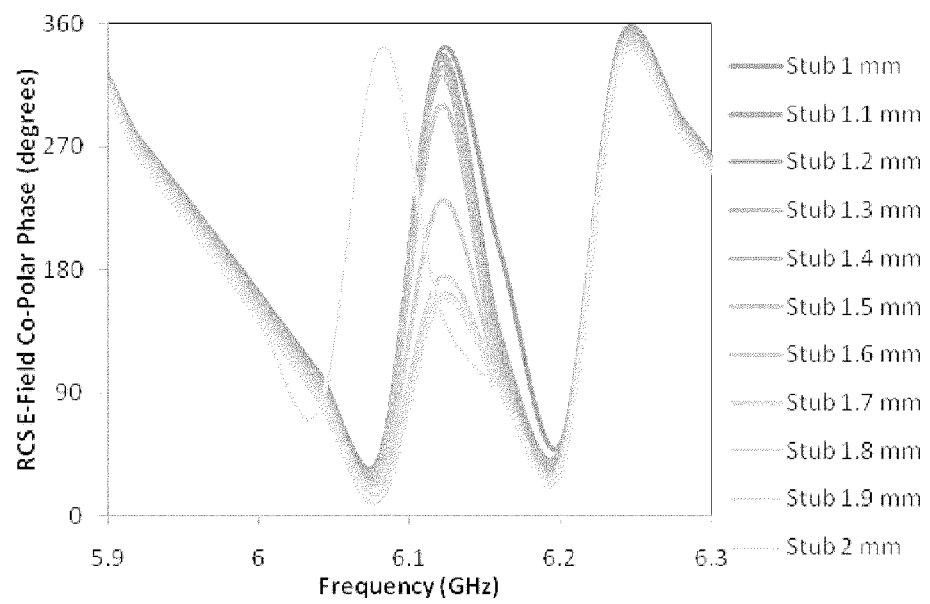
FIG. 16 is a graph of the phase of the backscattered signal from the array against frequency and relative to stub length.
Figure 17:
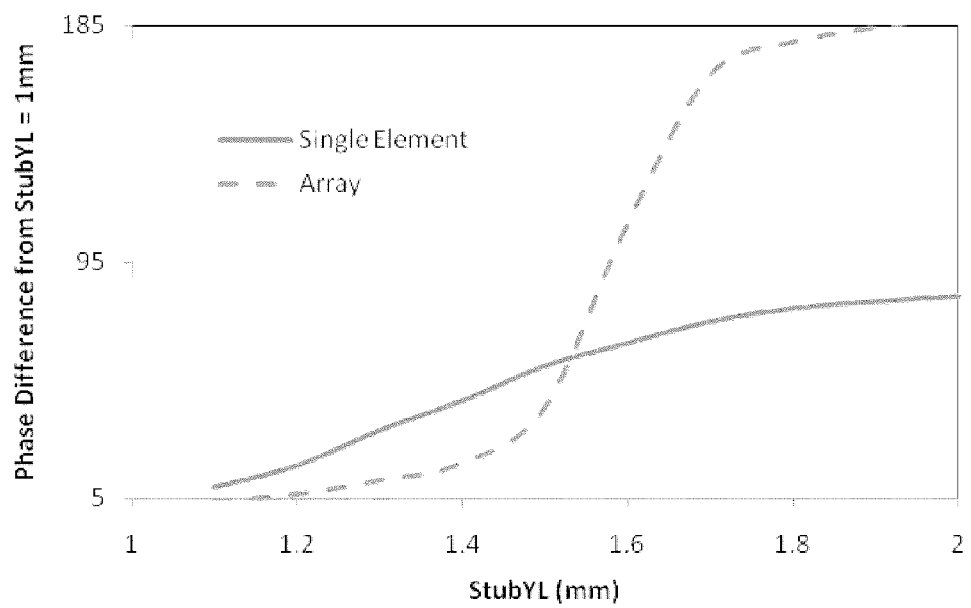
FIG. 17 is a graph of backscattered phase difference against stub length for the antenna of FIG. 7 and the array of FIG. 11.

With the size of the structure set the length of the loading stub was varied to determine corresponding changes in the scattering characteristics, as shown in FIGS. 16 and 17. There was a slight change of 80 MHz in the resonant frequency within the resonant bandwidth of the optimally matched structure, and a co-polar phase plot exhibited a shift of 189° for a change of 1 mm in the loading stub length (from 1 mm to 2 mm). The range of the phase difference in the orthogonally polarized backscattered signals realized by changing the length of the loading stub by 1 mm is significantly greater for the array: the single element SLMPA 700 provided a phase change of 82°, whereas the array 1100 provided a phase change of 189°, as shown in FIG. 17.

Figure 18:
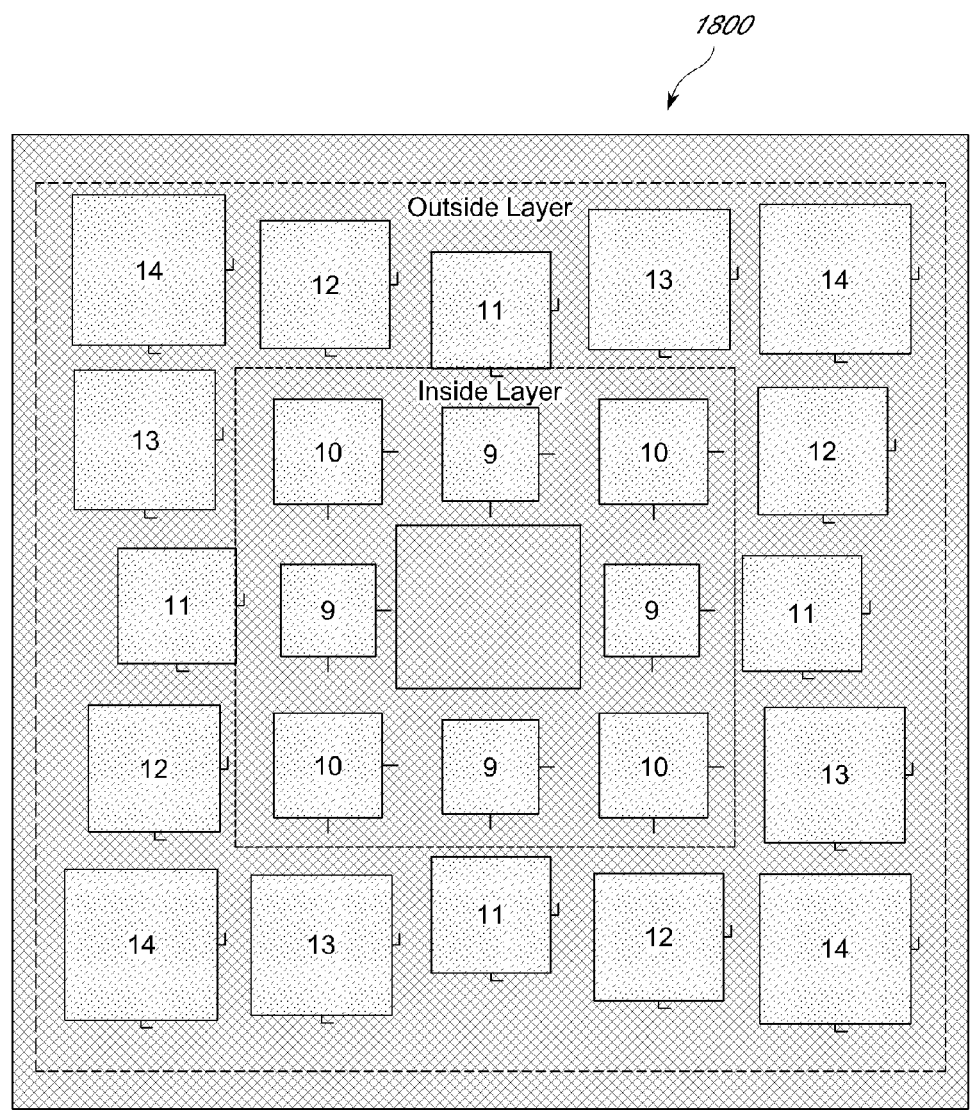
FIG. 18 is a diagram of a chipless transponder with six two-by-two patch antenna arrays, according to one embodiment.

To illustrate operation of the tag 102 using the array structure 1100 discussed above a prototype tag or transponder 1800 was designed. The transponder 1800, as shown in FIG. 18, includes 24 SLMPA patch elements 700 and was designed to operate in the UWB spectrum from 3.1 to 10.9 GHz. The transponder 1800 contains six resonant frequency signatures over the band from 4.5 to 6.75 GHz. As the tag 102 is fabricated using low cost conductive ink trace with a paper or plastic substrate, the prototype transponder 1800 operates on an inexpensive low performance PCB (FR4, $\in_r$=4.9) substrate material with a thickness of 1.5 mm and a loss tangent of 0.025.

The six-signature chipless RFID transponder 1800 includes optimally matched SLMPAs 700 at six resonant frequencies that do not interfere, and their parameters are listed in Table 1 below. Given the optimal spacing distance (S) for the Corners layout is larger than for the NSEW layout, the SLMPA arrays with shorter resonant wavelengths are placed at a smaller S, and with D closer to 0.

The transponder 1800 is symmetric for all resonant frequencies. Also, the non-radiating elements are placed or positioned so their mutual coupling effects are symmetric as well, and cancel each other out. This produces a main radiated beam for each resonant frequency that is aligned directly to boresight, with almost equal beamwidths for all resonant frequencies. This is significant as it enables each antenna array and thus the transponder 1800 to be read from a fixed location.

TABLE 1

| Patch Width (mm) | Resonant Frequency (GHz) | Stub Length (mm) | Stub Width (mm) |
|---|---|---|---|
| 9 | 7.24 | 1.1 | 0.2 |
| 10 | 6.47 | 1.5 | 0.2 |
| 11 | 5.91 | 1.6 | 0.2 |
| 12 | 5.45 | 1.75 | 0.2 |
| 13 | 5.06 | 2 | 0.2 |
| 14 | 4.7 | 2.3 | 0.2 |

In FIG. 18 the six sets of 2×2 SLMPA arrays are labelled with a number that indicates their patch width (9, 10, 11, 12, 13, 14 mm). The highest frequency (smallest size) SLMPAs are placed on the inner layer which has space for two sets of 2×2 SLMPA arrays (9, 10 mm). The outer layer includes the remaining four sets of 2×2 SLMPA arrays with the highest frequency array of these (11 mm) placed in the NSEW orientation, and the lowest frequency array (14 mm) in the Corners orientation. The intermediate frequency arrays (12, 13 mm) are placed in between NSEW and Corners layouts with |D| closer to 0 for the higher frequency array. A 90° bend is introduced on the loading stubs, as shown in FIG. 18, to allow the elements to be placed closer together while minimizing mutual coupling effects.

The effects of altering the sub lengths for each two-by-two array in the transponder 1800, and the ability to create a difference in the backscattered phase shift for a different stub length were simulated using the full-wave method-of-moments solver, and the obtained values are summarised below in Table 2.

TABLE 2

| Patch Width (mm) | Resonant Frequency (GHz) | StubYL Min (mm) | StubYL Max (mm) | Phase Shift (Degrees) |
|---|---|---|---|---|
| 9 | 6.72 | 0.1 | 1.1 | 12.02 |
| 10 | 6.06 | 0.5 | 1.5 | 33.77 |
| 11 | 5.6 | 0.7 | 1.7 | 10.21 |
| 12 | 5.16 | 0.7 | 1.7 | 23.73 |
| 13 | 4.8 | 1 | 2 | 12.8 |
| 14 | 4.48 | 1.3 | 2.3 | 24.12 |

To verify the simulated values, the transponder was also used in an experimental environment based on the operating principles described above, and a summary of the experimental results is shown below in Table 3.

TABLE 3

| Patch Width (mm) | Resonant Frequency (GHz) | StubYL Max (mm) | StubYL Min (mm) | Phase Shift (Degrees) |
|---|---|---|---|---|
| 9 | 6.987 | 0.6 | 0 | 15.75 |
| 10 | 6.591 | 1 | 0 | 162.73 |
| 11 | 6.118 | 1.2 | 0 | 14.21 |
| 12 | 5.621 | 1.2 | 0 | 11.29 |
| 13 | 5.244 | 1.5 | 0 | 24.65 |
| 14 | 4.878 | 1.8 | 0 | 19.66 |

The above shows an average measured phase shift of 41° at each signature frequency for the transponder 1800, and confirms the backscattered phase difference for each frequency signature can be controlled by adjusting the lengths of loading stubs of the antenna elements of the arrays. By increasing the operating frequency to higher frequencies, such as 40 GHz, the transponder size can be considerably reduced, such as to the size of a credit card or smaller. A tag 102 of this size can be fabricated on a plastic or paper substrate by printing the patch with conductive ink using a flexography printing process. The stubs of the patches, however, need to be varied for each tag 102 and to reduce cost are printed using conductive ink and an inkjet printing process. The ground plane can be printed, like the patch, using conductive ink and a flexography process.

The Reader

Figure 19:
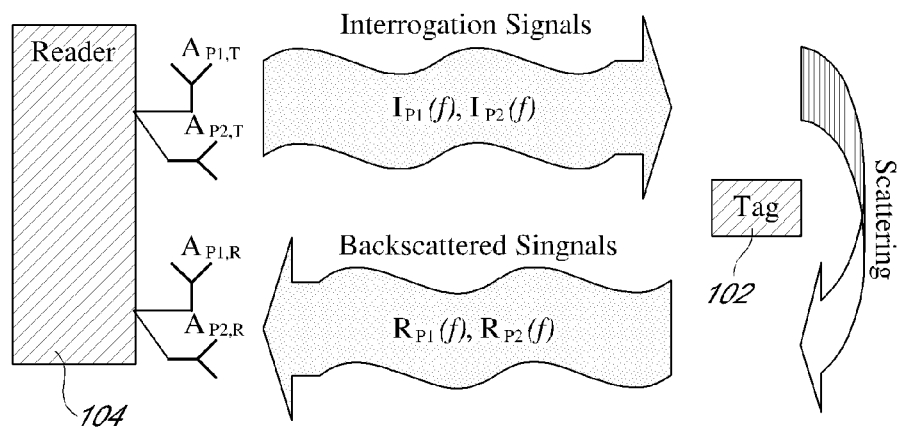
FIG. 19 is a diagram of an embodiment of the radio transponder system.

The transponder system 100 utilizes two orthogonal polarization states during both transmission and reception when interrogating the tag. The separate polarizations can be provided at the reader 104 with a single dual-polarized antenna, or two separate orthogonally polarized antennas ($A_{P1}$ and $A_{P2}$ for polarization states P1 and P2 respectively) as shown in FIG. 19. The system can also function using a mono-static setup where the same antennas are used for transmission and reception or in a bi-static setup, as shown in FIG. 19 where separate antennas are used for transmission ($A_{P1,T}$ and $A_{P2,T}$) and reception ($A_{P1,R}$ and $A_{P2,R}$). The reader 104 generates the interrogation signal, ($I_{P1}(f)$ and $I_{P2}(f)$), at a frequency, f (GHz), and then divides the power equally between $A_{P1,T}$ and $A_{P2,T}$. There are now two signals that propagate through free space towards the tag 102. The signals reach the transponder and are scattered according to its Radar Cross Section (RCS) characteristics. The tag 102 is designed so that the RCS characteristics differ in the orthogonal polarization states P1 and P2, as discussed above. The phase shift is set so that the return signals ($R_{P1}(f)$ and $R_{P2}(f)$) that propagate back towards the reader have a phase difference of, $\Delta_{\phi_N}$.

The signals are orthogonally polarized and travel through the same propagation path, so the path loss should be almost the same. The difference between the return signals is only due to differences in the scattering properties of the transponder for the two orthogonal polarization states. The phase difference is then converted into a set of discrete bins (each defining an accepted range of phase difference values) called phase signatures that are used to obtain digital data from the return signals at each resonant frequency. For example, for 7 frequency signatures, each frequency signature will contain a discrete phase difference between 0-180°, and each phase signature is resolved to the nearest 10° creating 18 possible combinations for each frequency signature instead of the standard 2 combinations (binary).

At a number of distinct resonant frequencies $f_1$ to $f_N$, a phase difference, $\phi_N$ can be generated as defined in Equation (20).

$$\phi_N = \angle R_{P1}(f_N) - \angle R_{P2}(f_N), \text{ where } 0 \leq |\phi_N| \leq 180 \quad (20)$$

For a transponder system 100 configured to resolve the phase of the backscattered signal with a tolerance of ±T/2 degrees then (180/T) unique combinations or bins can be used for defining digital data. This means we can calculate the total number of digital bits ("BITS") of information in the transponder which is presented in Equation (21).

$$BITS = \left\lfloor N\log_2\left(\frac{180°}{T°}\right)\right\rfloor \quad (21)$$

That is, the number of represented bits (BITS) is at least equal to the highest integer value equal to or less than (i.e. the "floor" of) a product of: the number of frequency signatures; and the base-2 logarithm of the number of bins. The number of bins is determined by the total detachable phase angle (180°) divided by the resolution of the bins (T°).

For example, if 7 frequency signatures exit between 2 and 2.7 GHz, (meaning that N=7), and each of the frequency signatures can be broken up into phase signatures with a tolerance, T/2=5 degrees, (so T=10 degrees), the number of bits is:

$$BITS = \left\lfloor 7\log_2\left(\frac{180°}{10°}\right)\right\rfloor = 29$$

So in a 700 MHz section of the EM spectrum which previously held 7 bits of data, 29 bits can now be held.

Figure 20:
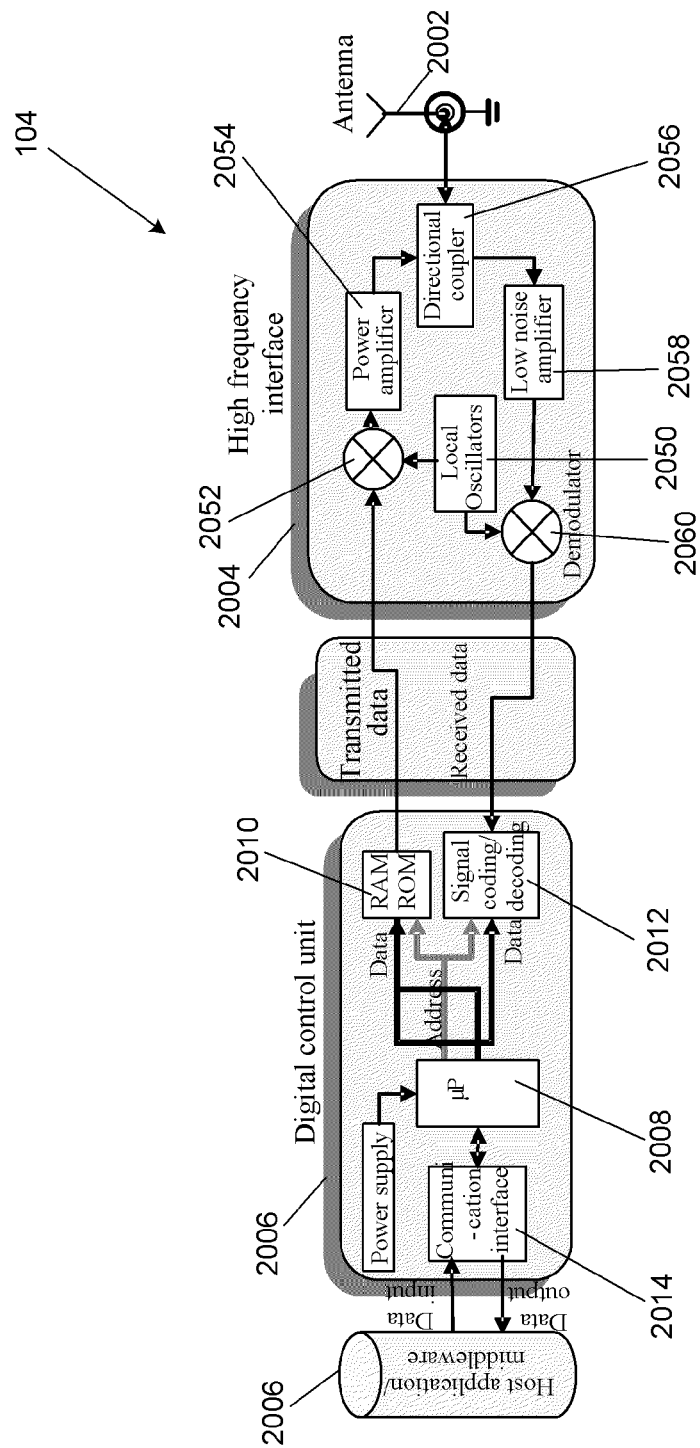
FIG. 20 is a block diagram of a reader of the radio transponder system.

The reader 104, as shown in FIG. 20, operates at microwave frequencies, and includes a planar array transmit and receive antenna 2002, a high frequency interface unit 2004 connected to the antenna 2002, and a digital control unit 2006 connected between the application system 106 and the high frequency interface unit 2004.

The digital control unit 2006 includes microcontroller circuitry to perform digital signal processing on the data obtained from the RFID transponder 102 and to also control transmission of interrogation signals generated by the high frequency interface unit 2004. The control unit 2006 enables the reader 104 to communicate with the transponders 102 wirelessly by performing modulation and anti-collision procedures and decoding the received data from the transponders 102. The unit 2006 includes a microprocessor 2008, a memory block 2010, analog-to-digital converters 2012 and a communications interface 2014 for connecting to the application system 106.

The HF interface unit 2004 transmits and receives radio frequency (RF) signals, and includes two separate signal paths to correspond with the two directional data flows from and to the transponder 102. A local oscillator 2050 (LO) generates the RF carrier signal, which is amplified by a power amplifier 2054, and the amplified signal is transmitted through the antenna 2002. A directional coupler 2056 separates the reader's transmitted signals and the received weak backscattered signals from the tag 102. The directional coupler consists of two continuously coupled homogenous transmission lines, and if all ports are matched, the power of the incoming and outgoing signals is divided in the coupler. The received backscattered signal is weak and a low noise amplifier 2058 increases the signal's amplitude before it is fed to an RF mixer 2052 with the signal generated by the local oscillator 2050 to produce an intermediate frequency signal. The intermediate frequency signal is processed by a gain and phase detector 2060 to generate received data for the digital control unit 2006. The HF interface unit 2004 is protected from EM interference using metal cages.

Figure 21:
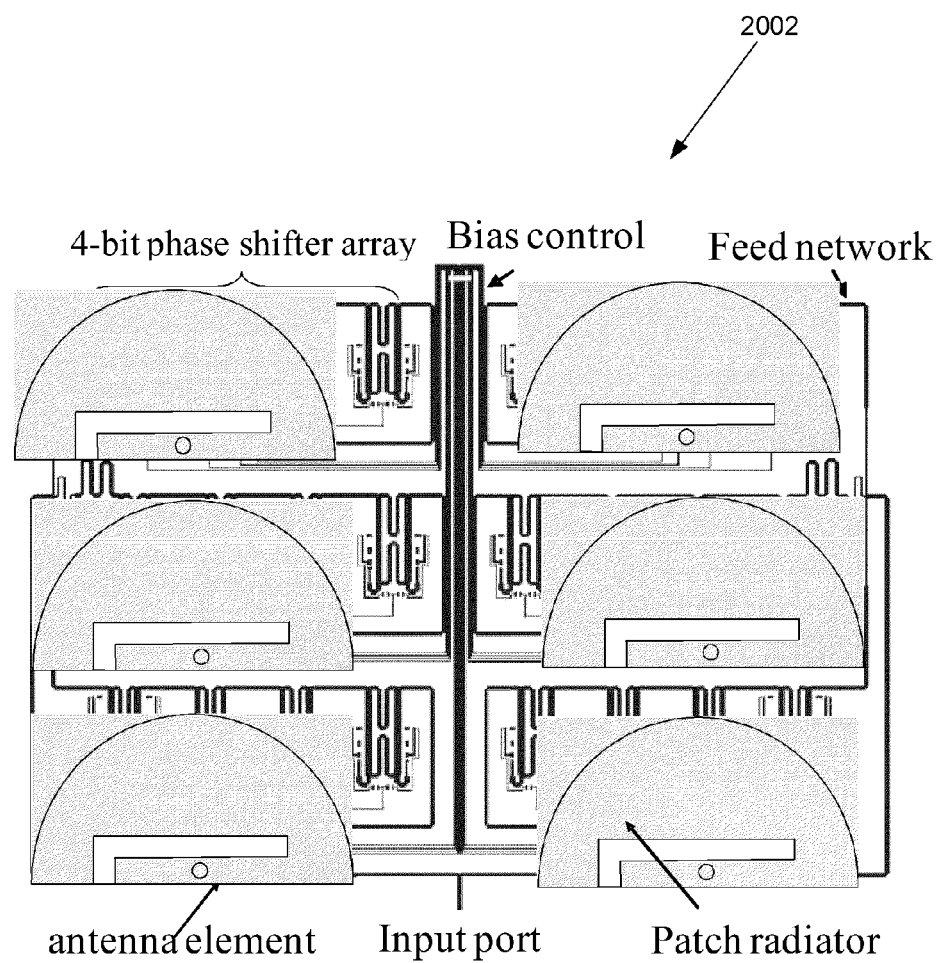
FIG. 21 is a diagram of an antenna of the reader.
Figure 22:
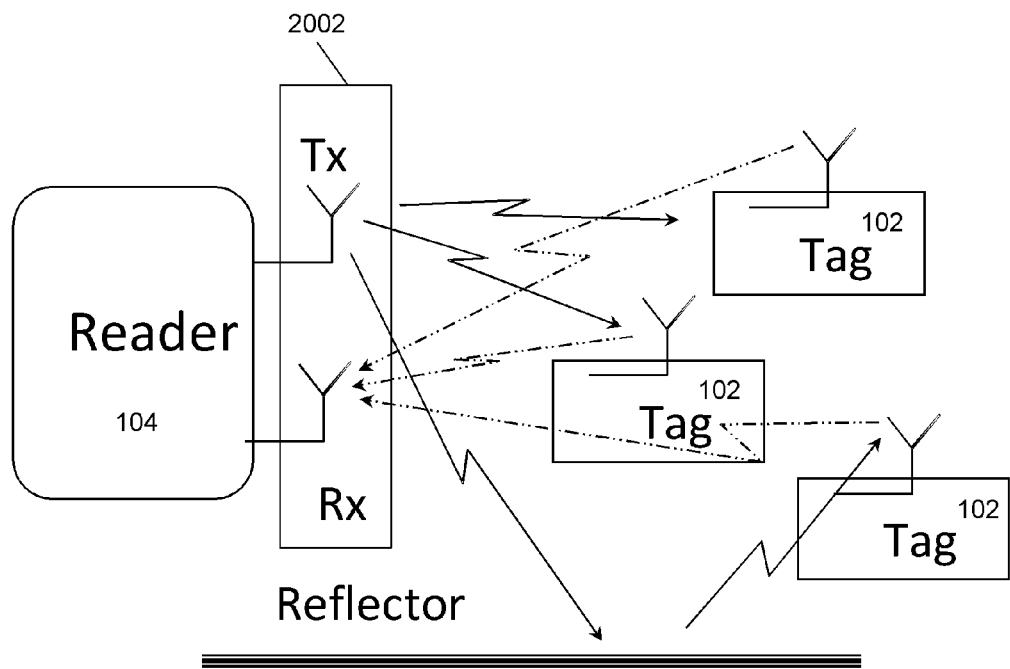
FIG. 22 is a block diagram of the reader reading a number of tags.

The antenna 2002 includes two phased array antennas 2100 which each comprise, as shown in FIG. 21: (i) a 3×2 element phased array antenna panel; and (ii) associated beamforming modules, as discussed in N. C. Karmakar, "Smart Antennas for Automatic Radio Frequency Identification Readers," Chapter 21, in Handbook on Advancements in Smart Antenna Technologies for Wireless Networks, Idea Group Inc., USA, pp 449-473 ("Karmakar 1"). Each beamforming module is a 4 bit digital phase shifter array to control the beam in a three dimensional (3D) plane. The phase shifter arrays, connect to individual element of the array antenna, control the values of $\beta_x$ and $\beta_y$ in Equation (11) which are the individual x- and y-plane phase shifts of elements, thus enabling beamforming in a 3D plane. To achieve generation of the orthogonally polarized interrogation signals, two sets of the beamforming modules or networks including the two array antennas 2100 are operated coherently. The same beamforming networks that are used for transmission are also used for reception. The antennas 2100 are oriented in orthogonal planes for the polarization diversity as described with reference to FIG. 19. The transmission and reception paths are separated using a circulator or coupler as part of the directional coupler 2056 of FIG. 20. Dual-polarized sub-arrays can be used instead of the array elements of the antenna 2100 for high resolution dual-polarized signal transmission and reception. A number of antennas are used in various positions to exploit diversity. For example, in an active three-antenna configuration, a single pole three throw (SP3T) switch activates three adjacent array modules to collimate the in-phase beams in even further fine resolution. The antenna 2002 can then produce high gain scan coverage in 360° azimuth and elevation plane patterns. The antenna 2002 detects individual RFID tags 102, as shown in FIG. 22. The exact bearing of each tag 102 from the reader 104 is calculated from the beam position of the antenna. For further fine tuning of the directional arrival (DoA) of the tags' signals, a post-processing Multiple Signal Classification (MUSIC) algorithm, as discussed in C. Sun and N. C. Karmakar, "Direction of Arrival Estimation with a Novel Single Port Smart Antenna," EURASIP Journal on Applied Signal Processing, 2400:9, 1364-1375.2004 ("Karmakar 2") is used. Being very directive, the antenna 2002 filters out side interference. An alternative is to select frequencies with a reconfigurable antenna.

The interrogating signals from the reader transmit antenna Tx, as shown in FIG. 22, are sent to the tag 102 which returns frequency modulated echoes towards the reader 104 and the receive antenna Rx of the reader 104 receives the modulated echoes.

Figure 23:
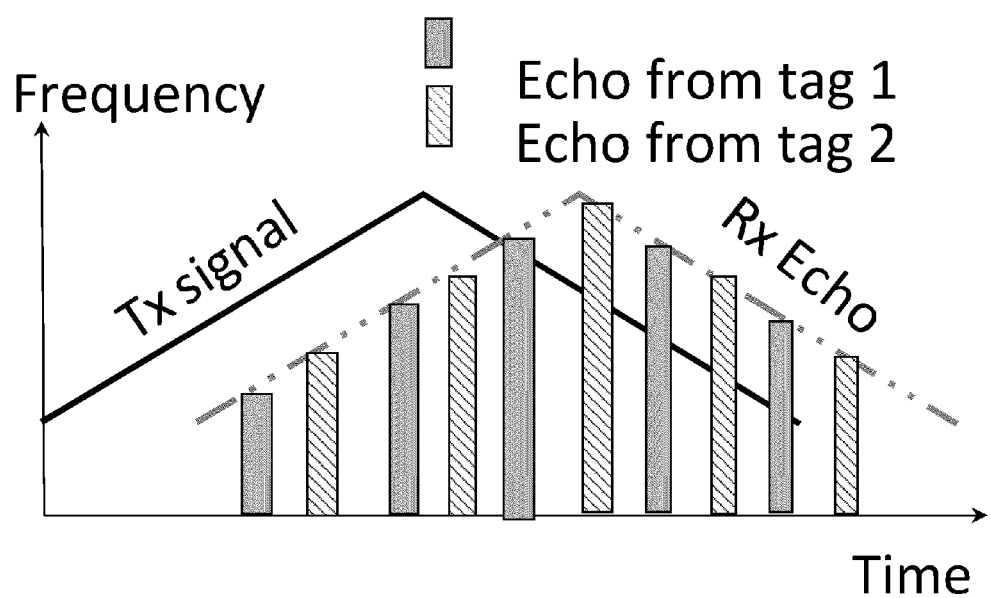
FIG. 23 is a graph of frequency against time illustrating frequency modulated continuous wave signal analysis for transmitted and received signals of the reader.

The reader 104 can use frequency modulated continuous wave (FMCW) signals from the transmit antenna Tx, with an instantaneous frequency that varies linearly in time, as shown in FIG. 23. The receive antenna Rx receives modulated echoes after a time delay, where the echoes for tags with different resonant frequencies are received at different times, as shown in FIG. 23. If the frequency response of the tags are well separated in frequency, the FMCW echo signals will automatically be placed in different frequency bins for separate processing. In the signal processing both amplitude and phase of the radar cross section (RCS) are stored and processed. If the frequency response of the tags are not well separated, and tags' echoes overlap in the received time-frequency spectrum, then the added phases and amplitudes can indicate the number of tags which send the echo signals.

For the phase encoded chipless RFID tags 102, the phase difference is significant and the phase vector addition of the echo signals is used to determine the presence of the bits encoded in each tag 102. The reader 104 is able to determine the number of tags 102 which are collided in time and frequency spectrum. The received FMCW signals are used to distinguish moving tags 102 from stationary tags 102 by recording any Doppler shift of echo signals and the range of the tags 102. Time-domain windowing techniques are used to enhance the detection quality of echo signals. The reader 104 uses anti-collision measures, such as time of arrival (ToA), direction of arrival (DoA), polarization diversity (PD), cross correlation of echo signals and frequency chirping of carrier signals, to discriminate between tags 102, particularly those in close proximity.

While certain embodiments have been described with respect to the accompanying drawings, the embodiments are for illustrative purposes only and are not considered limiting. It is to be appreciated that those skilled in the art can change or modify the embodiments without departing from the scope and spirit of the claims.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

The invention claimed is:

1. A radio frequency transponder, comprising:
   a substrate; and
   a plurality of planar antennas on the substrate, wherein each antenna has a shape configured to determine a corresponding resonant frequency of the antenna, wherein each of the antennas is configured to determine a phase difference between orthogonal components of a backscattered signal generated in response to excitation of the antenna at the resonant frequency, and wherein the phase difference represents a unique code for the antenna, the unique code being configured to be extracted only from the phase difference between the orthogonal components of the backscattered signal.

2. A radio frequency transponder as claimed in claim 1, wherein the shape of the antenna determines the phase difference.

3. A radio frequency transponder as claimed in claim 2, wherein the antenna includes a load element to control a value represented by the code.

4. A radio frequency transponder as claimed in claim 3, wherein the shape is a polygon with equal sides.

5. A radio frequency transponder as claimed in claim 4, wherein the shape is square.

6. A radio frequency transponder as claimed in claim 5, wherein the load element is a stub of the antenna, and wherein the stub has a length which determines the value of the code.

7. A radio frequency transponder as claimed in claim 6, further comprising a conductive ground plane, wherein the substrate is on the ground plane.

8. A radio frequency transponder as claimed in claim 1, wherein the antenna is printed using electrically conductive ink on the substrate which is dielectric.

9. A radio frequency transponder as claimed in claim 1, further comprising arrays of antennas with the same resonant frequency and having a symmetrical layout.

10. A radio frequency transponder as claimed in claim 9, wherein each array represents a frequency signature with one of a number of phase signatures determined from the phase difference of the backscattered signals at the resonant frequency for the array, and wherein the phase signature represents a value of the code.

11. A radio frequency transponder as claimed in claim 10, wherein the layout of the arrays is symmetrical to cancel mutual coupling effects of the non-radiating antennas and provide a symmetrical response at each resonant frequency.

12. A radio frequency transponder as claimed in claim 11, further comprising a first layer of the layout with arrays of higher resonant frequencies than arrays of a second layer of the layout surrounding the first layer.

13. A radio frequency transponder as claimed in claim 1, wherein the transponder is passive and chipless.

14. A radio frequency transponder as claimed in claim 1, wherein the antennas have respective different resonant frequencies configured to isolate the backscattered signals from each other.

15. A radio frequency transponder as claimed in claim 1, wherein the unique code is configured to be extracted based on a comparison between the phases of the orthogonal components of the backscattered signal.

16. A radio frequency transponder as claimed in claim 1, wherein the transponder stores the extracted unique code.

17. A radio-frequency identification transponder, comprising:
   a dielectric substrate; and
   a plurality of antennas formed on the substrate and configured to generate backscattered signals each including different polarization components, wherein the antennas comprise a plurality of load elements each of which is configured to determine a phase difference between the different polarization components of the corresponding backscattered signal, and wherein the phase difference represents a unique code for the antenna, the unique code being configured to be extracted only from the phase difference between the different polarization components of the corresponding backscattered signal.

18. A radio frequency transponder as claimed in claim 17, wherein the transponder is passive and chipless.

19. A radio frequency transponder system, comprising:
   a radio-frequency identification transponder, comprising:
      i) a dielectric substrate, ii) a plurality of antennas formed on the substrate and configured to generate backscattered signals each including different polarization components and iii) load elements of the antennas each of which is configured to determine a phase difference between the different polarization components of the corresponding backscattered signal, wherein the phase difference represents a unique code for the transponder; and
   a reader configured to generate the interrogation signals and extract the unique code only from the phase difference between the different polarization components of the corresponding backscattered signal.

20. A radio frequency reader for interrogating a radio frequency transponder, comprising:
   a frequency interface unit configured to transmit a plurality of polarized interrogation signals and receive a plurality of backscattered signals from the transponder in response, wherein each of the backscattered signals includes different polarization components, wherein the transponder is configured to determine a phase difference between the different polarization components of the corresponding backscattered signal, and wherein the phase difference represents a unique code for the transponder; and a signal processing unit configured to extract the unique code for the transponder only from the phase difference between the different polarization components of the corresponding backscattered signal.

21. A radio frequency reader as claimed in claim 20, wherein:

the frequency interface unit includes a phased array antenna configured to transmit and receive frequency modulated continuous wave signals with frequency and polarization diversity to read multiple transponders; and the signal processing unit is configured to process the received signals using a direction of arrival and phase difference detection process.

22. A radio frequency process, comprising:

transmitting polarized interrogation signals;

receiving backscattered signals each including orthogonal components from a transponder in response;

determining a phase difference between the orthogonal components of the corresponding backscattered signal, wherein the phase difference represents a unique code for the transponder; and extracting the unique code for the transponder only from the phase difference between the orthogonal components of the corresponding backscattered signal.

23. A radio frequency transponder, comprising:

means for transmitting polarized interrogation signals;

means for receiving backscattered signals each including orthogonal components from a transponder in response;

means for determining a phase difference between the orthogonal components of the corresponding backscattered signal, wherein the phase difference represents a unique code for the transponder; and means for extracting the unique code for the transponder only from the phase difference between the orthogonal components of the corresponding backscattered signal.

* * * * *